(12) United States Patent
Dornhege et al.

(10) Patent No.: US 7,954,593 B2
(45) Date of Patent: Jun. 7, 2011

(54) METHOD FOR COMPENSATING FOR DRIVE INFLUENCES ON THE STEERING SYSTEM OF A VEHICLE USING AN ELECTRIC POWER STEERING SYSTEM

(75) Inventors: Jens Dornhege, Pulheim (DE); Torsten Wey, Moers (DE); Timothy Gerard Offerle, Whittaker, MI (US); Brad G. Hochrein, Dexter, MI (US); Rakan C. Chabaan, Oak Park, MI (US); Kirt L. Eschtruth, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 272 days.

(21) Appl. No.: 11/858,473

(22) Filed: Sep. 20, 2007

(65) Prior Publication Data

US 2009/0078494 A1 Mar. 26, 2009

(30) Foreign Application Priority Data

Sep. 20, 2006 (DE) .......................... 10 2006 044 088

(51) Int. Cl.
*B62D 5/04* (2006.01)
(52) U.S. Cl. ............. 180/446; 180/443; 701/41; 701/44
(58) Field of Classification Search .................. 180/446, 180/443; 70/41, 44
See application file for complete search history.

(56) References Cited

U.S. PATENT DOCUMENTS

| | | | |
|---|---|---|---|
| 4,830,127 A | 5/1989 | Ito et al. | |
| 5,845,222 A | 12/1998 | Yamamoto et al. | |
| 6,032,755 A | 3/2000 | Blandino et al. | |
| 6,122,579 A | 9/2000 | Collier-Hallman et al. | |
| 6,148,951 A | 11/2000 | Nishi et al. | |
| 6,965,820 B2 | 11/2005 | Amberkar et al. | |
| 7,092,805 B2 | 8/2006 | Kasahara et al. | |
| 2003/0144780 A1* | 7/2003 | Recker et al. | 701/41 |
| 2003/0213640 A1 | 11/2003 | Kato et al. | |
| 2004/0016594 A1* | 1/2004 | Yasui et al. | 180/446 |
| 2005/0209751 A1* | 9/2005 | Kato | 701/41 |
| 2006/0041355 A1 | 2/2006 | Blundell et al. | |
| 2006/0070794 A1 | 4/2006 | Fujita et al. | |
| 2006/0086560 A1 | 4/2006 | Furusho et al. | |
| 2008/0275624 A1* | 11/2008 | Snyder | 701/104 |

* cited by examiner

*Primary Examiner* — Tony H. Winner
*Assistant Examiner* — Jacob Knutson
(74) *Attorney, Agent, or Firm* — Angela M. Brunetti; Fredrick Owens

(57) ABSTRACT

The invention relates to a method for compensating for drive influences of a drive train of a motor vehicle on its steering system, said motor vehicle having an electric power steering system. A drive train simulation model which is integrated into the motor vehicle and permanently activated is used to determine disturbance variables from a driven behavior so that a compensation torque which counteracts the disturbance variables is generated for the power steering system.

15 Claims, 4 Drawing Sheets

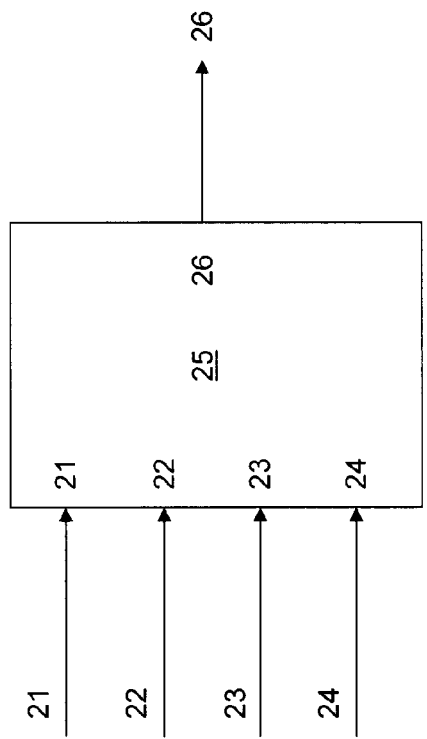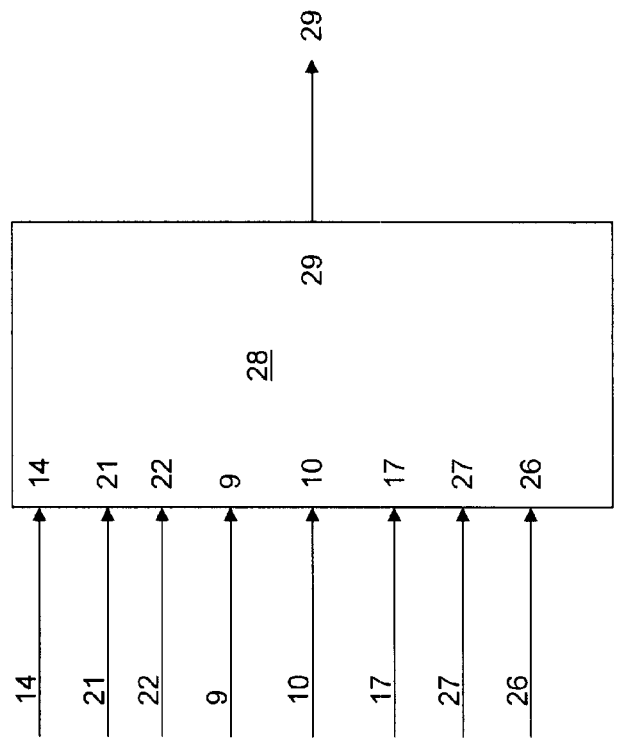

METHOD FOR COMPENSATING FOR DRIVE INFLUENCES ON THE STEERING SYSTEM OF A VEHICLE USING AN ELECTRIC POWER STEERING SYSTEM

FIELD OF THE INVENTION

The invention relates to a method for compensating for drive influences of a drive train of a motor vehicle on its steering system, said vehicle having an electric power steering system.

BACKGROUND OF THE INVENTION

When a vehicle accelerates strongly it is possible to observe that motor vehicles with a driven front axle influences the steering as a result of the drive forces. The driver of the vehicle must actively intervene in order to counteract the steering force error which is generated, and to maintain the selected course. Some causes for this include secondary torques from the external constant velocity joints of the drive shafts if there are different bending angles on both sides of the vehicle; asymmetrical drive forces resulting from the friction in the differential gear mechanism; or a differential gear mechanism which is self locking or locks in a controlled fashion or from forces of inertia. Furthermore, strong influences come from the geometric conditions of the driven front wheels with respect to the road surface, as a result of which the force application point of the tire force moves.

It is known to use a bearing block in the longer half shaft in order to bring about an equal length of the left and right hand half shafts. This bearing block is however extremely costly to acquire and mount and applies an additional weight to the motor vehicle so that, for example, the fuel consumption increases. It is also known to reduce the friction of a differential bevel gear mechanism. However, this requires a high degree of technical complexity and is therefore possible only to a limited extent. In many motor vehicles this friction is even desired as a locking effect in order to increase the acceleration capability of the vehicle. Furthermore it is known that a short lever arm of the tire force is advantageous for the virtual steering axis of the wheel. However, for structural reasons, it is often not possible to shorten this lever arm.

Both hydraulic power steering systems and manual power steering systems of the known type can only be changed in terms of their steering property or their settings (tuning) under extremely large and costly circumstances in order to reduce the abovementioned disadvantages. However, these changes are generally always accompanied by the worsening of other desired properties. In contrast, the electric power steering system (EPAS) uses a microprocessor and therefore can reach a specific "smart" operating level. This "smart" operating level makes it possible to adapt the steering properties of the motor vehicle to the requirements and operating conditions of the vehicle, the desires of the driver, or to actively counteract the disturbances.

A fundamental problem in the configuration of motor vehicles related to the vehicle's handling properties, are steering torques or disturbance variables which can be perceived by the driver of the vehicle. In this context, the designer of the motor vehicle has a number of alternative approaches available, but all the currently known options are also subject to disadvantages. Electronically controlled steering systems (EPAS) are presently being used to an ever greater extent in the automobile industry. As a result, it now makes it possible to obtain previously unforeseen advantages as the motor vehicle industry is increasingly applying microprocessor technology in steering systems (EPAS).

Drive train influences or drive influences, in particular on a steerable axle of the motor vehicle, could possibly have an adverse effect on a steering sensation of the driver of the vehicle such that the driver of the motor vehicle could find it to be an unacceptable nuisance during normal control of the motor vehicle. In particular for front wheel drive but also for all wheel drive vehicles, the steering sensation is largely influenced by the drive forces of the engine. These influences are a function of the system design and their intensity depends to a great extent on the front axle design, external influences, and the performance capability of the drive train. Because these perceived changes in the steering torque do not correspond to the natural feedback of the vehicle to a specific situation and are therefore perceived by the driver as a disturbance. In extreme cases, the influences may be so strong that they cause a change in direction of the vehicle, which can lead to considerable damage, even to personal injury.

SUMMARY OF THE INVENTION

According to one object of the present invention, an improved method for compensating for drive influences of the type mentioned above using an elegant means. The method provides that interfering influences are kept away from the driver of the motor vehicle or changes in the desired direction of travel of the vehicle are avoided.

According to one embodiment of the invention, a drive train simulation model is integrated into the motor vehicle and permanently activated such that disturbance variables are predicted from a drive behavior so that a compensation torque which counteracts the disturbance variables is generated for the power steering system.

In a preferred embodiment, the invention has the advantage of being able to combine an auxiliary device which is based on a brake system and has the purpose of controlling the stability of a motor vehicle, with the electric power steering system. This auxiliary device influences a steering sensation of the driver of the vehicle which may changes abruptly if the frictional resistance of one of the wheels of an axle changes asymmetrically. In this context, an autonomous countersteering signal is generated which can be perceived by the driver of the vehicle. The input variables for this may be based on a wheel longitudinal slip. In contrast, an abruptly changing steering sensation subject to acceleration forces can be compensated without the aid of the auxiliary device which is based on the brake system and has the purpose of stability control.

The invention has the further advantage of reliably detecting the (undesired) disturbance variables and separating them from the (desired) feedback of the tire/road contact. The simulation model is preferably stored in a control unit of the motor vehicle. The invention ensures that an amplitude and a direction of action of the drive influences are determined and eliminated by an opposed force in the steering system. This achieves the object of the compensation function of keeping away the interfering influences from the driver or avoiding changes to the desired direction of travel of the vehicle. Therefore, a function can be permanently activated which calculates drive influences or the drive behavior and compensates them by predefining a correction torque or compensation torque to the electric power steering system.

In another embodiment, the prediction or calculation of the drive influences on the steering system (which are referred to below as disturbance variable or disturbance torque) is based on a simplified drive train simulation model which receives input data from other electronic control devices, or from at least one electronic control device, of the motor vehicle (vehicle bus). This input data may include, for example, driver's requests such as position of the accelerator pedal, clutch and steering input as well as reactions of the vehicle to these predefined values, such as engine torque, engine speed, wheel speeds and lateral acceleration. Based on this input data, it is possible to make a reliable prediction of the disturbance variables or disturbance torques using suitable parameterization of the model in wide ranges of the driving states. These parameters may include, inter alia, the rotational inertia values of the driven wheels and of the differential, the rigidity values of the drive shafts, the coefficients of friction for the differential gear mechanism toothings, geometric data of the driven front axle and its wheels as well as steering transmission ratios and gear mechanism transmission ratios.

In an alternative embodiment, a further algorithm addresses disturbance variables which occur when there are differences in the rotational speeds of the driven wheels. There are ranges in which the predictions of the disturbance variables, identified by the initial embodiments above, are not very reliable. This applies in particular if the difference in rotational speed between the driven front wheels varies around the zero point at small amplitudes.

In these ranges, in the event of strong acceleration during which it is very likely that disturbance variables or disturbance torques occur, the correction torque or compensation torque must be adjusted in accordance with a difference between the measured or estimated toothed rack force and a reference which is to be calculated internally or externally. This reference (setpoint force for the toothed rack) can be calculated, for example, on the basis of the driving conditions of the motor vehicle. Here, for example the speed of the vehicle, lateral acceleration, yaw rate, steering angle and change in the steering angle are taken into account. In addition, disturbance torques can be caused by influences of the underlying surface such as one-sided unevenness of the ground or ruts in the underlying surface. These events are detected by a further algorithm and the deviation from the above specified reference is correspondingly compensated.

In a further embodiment of the invention, the compensation torque is applied as a function of an uneven slip of tires of the steerable axle. By observing wheel speeds it is possible here to advantageously detect situations in the context of the driving state in which, owing to the tire/underlying surface frictional conditions, uneven slip of tires of the steerable axle is produced, and as a result drive influences or disturbance variables are produced. Therefore, the resultant disturbance variables can be eliminated.

The invention has the advantage of providing for the compensation torque of the difference between the toothed rack force and the reference described above (setpoint force for the toothed rack) to be adjusted so that the disturbance variables are eliminated. With the simulation model and an applied algorithm it is advantageously possible to detect situations in which, owing to the geometric tire/underlying surface contact conditions, drive influences or disturbance variables are produced. In these cases, for example the center points of the tire contact area changes. This center point of the tire contact area, projected onto the rotational axis of the wheel in the plane of the wheel, forms the force application point of the drive forces on the front wheel suspension. As a result of the lever arm of this force application point, which is changed with respect to the longitudinal axis of the vehicle, to the virtual steering axis of the wheel a steering torque is generated which has to be compensated by means of the steering system. The amplitude of this disturbance cannot be derived from the vehicle data. Therefore, these disturbance variables are also eliminated.

When the steering system is activated, the wheel rotates about what is referred to as the virtual steering axis. The virtual steering axis within the sense of the invention is that which can be constructed from kinematics articulation points or from intersection points of prolongations of struts.

A further advantage of the invention is that the compensation torque is configured in such a way that sudden changes in the steering torque which can be perceived by the driver are avoided. In order to avoid the driver perceiving sudden a change in the perceptible steering torque, the compensation torque is favorably generated in such a way that it adapts in an infinitely variable fashion.

In a further embodiment, junction regions in which pluralities of the compensation's mechanisms complement one another are preferably defined so that the disturbance variable is eliminated. These junction regions are defined wherever, owing to the ambient conditions such as, for example, engine torque, wheel speeds, lateral acceleration and measured steering torque, it is assumed that disturbance torques occur and the simulation model operates at the edge of its validity range, as a result of which the prediction of the disturbance variable becomes imprecise.

The invention has the further advantage of compensating for disturbances due to the brake control system.

It is possible for the motor vehicle to have a brake control system, for example ABS. The brake control system can bring about one sided braking intervention at the steerable axle and thus a resulting distribution of the drive torque, which in turn brings about a disturbance torque in the steering system. In the case of a one sided intervention at the steerable axle, the resulting drive torque distribution of the two wheels of the steerable axle is therefore advantageously used to calculate the compensation torque so that there is expediently provision for the compensation torque to be generated as a function of a drive torque distribution of the steerable axle and for the disturbance variable to be eliminated.

The invention has the further advantage of compensating for disturbances due to a locking differential. It is possible for the motor vehicle to be equipped with a differential gear mechanism which is self locking or locks in a controlled fashion so that there is expediently provision for the compensation torque to be generated as a function of a locking effect of the differential gear mechanism which is self locking or locks in a controlled fashion so that the disturbance variable is eliminated. In the case of a self locking differential gear mechanism, the amplitude and the response behavior of the locking effect are incorporated into the parameterization of the model for simulating the drive train. If the motor vehicle is equipped with a differential gear mechanism which locks in a controlled fashion, the locking value can be obtained from its control means so that said value can also be included in the calculation of the steering compensation torque.

Since the drive influence or a disturbance variable influence can be reproduced and measured in a repeatable fashion, the invention provides the further potential advantage for the steering system (in particular EPAS), or other systems which are arranged in the motor vehicle, to detect and predict these. However, the present invention is largely concerned with reacting to the drive influence or the disturbance variable. Therefore, as soon as a drive influence or a disturbance variable is detected, the electronic power steering system can reliably react to this process and generate a correspondingly opposed force so that the disturbance variable can be eliminated without the driver of the motor vehicle noticing the disturbance variables and the compensation torque.

The compensation torque can be generated by one or a combination of the options mentioned below.

In a first embodiment, the compensation torque may be generated by acting on the steering force (wheels of a steerable axle) by adding an additional auxiliary force to the power steering system which is counter to the disturbance variable, so that the negative effect or the disturbance variable is eliminated before the driver of the motor vehicle can at all detect it.

In a second embodiment, the compensation torque may be generated by using the electric power steering system which is additionally damped with suitable means. In particular the additional damping cancels out the roughness of the build up in the disturbance variable, which does not cause the disturbance variable to be eliminated but rather results in sudden changes in the steering torque which can be perceived by the driver being avoided by virtue of the fact that the build up of the disturbance variable is reduced in terms of its speed and roughness.

In a third embodiment, the compensation torque may be generated by changing an additional auxiliary force in addition to the electric power steering system. Such a strategy would permit the driver to react against the undesired drive influence or against the undesired disturbance variable by means of sensor mechanisms. In this context, the torque from the driver is also adapted to the instantaneous driving state so that the driver is provided with the possibility of better controlling the process. The type and the absolute value of the compensation torque can be a function of other vehicle signals or input data such as, for example, speeds of the vehicle, engine torque, tire pressure etc. As a result, the driver is enabled to maintain orderly control of the motor vehicle, in particular when it is subject to strong acceleration, without disadvantageous compromises having to be made in terms of increased costs, reduced power or limited installation space, since it is possible to dispense with separate mechanical components.

BRIEF DESCRIPTION OF THE DRAWINGS

Further advantageous refinements of the invention are disclosed in the subclaims and the following description of the figures. In the drawings:

FIG. 3 is a block diagram showing the calculation of the setpoint force at the toothed rack, FIG. 4 is a block diagram of the weighting of the synthetic setpoint toothed rack force.

DETAILED DESCRIPTION OF THE PREFERRED EMBODIMENTS

Figure 1:
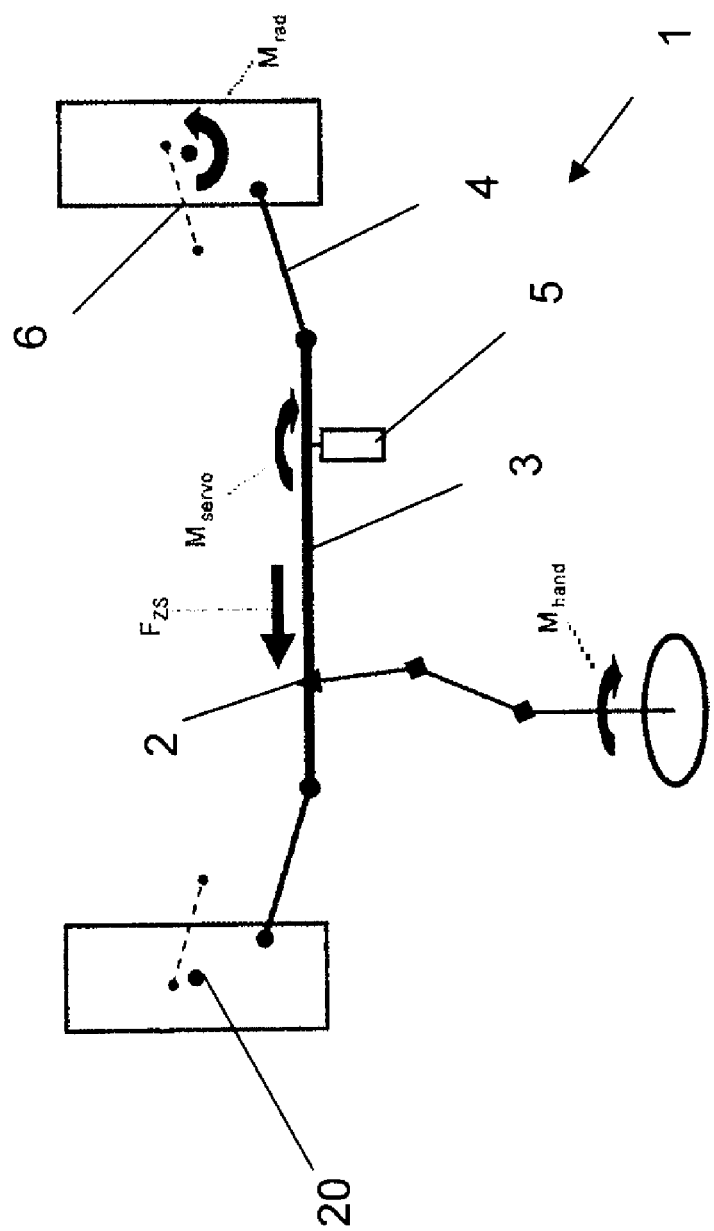
FIG. 1 is a system outline of an electric toothed-rack power steering system.

FIG. 1 shows an exemplary principle of a toothed rack steering system 1 with electrical power steering assistance (EPAS) (steering system). On the one hand there is the steering wheel manual torque $M_{hand}$, and on the other hand the assistance torque of the servomotor $M_{servo}$, which, precisely like the steering wheel manual torque, is converted into the toothed rack force FZS by means of a suitable gear mechanism 2. A toothed rack 3 in turn is supported by means of track rods 4 on pivot bearings and thus controls the rotation of the wheels about a virtual steering axis 6, which apply the wheel steering torque $M_{rad}$ to the steering system from the tire/underlying surface contact. A servomotor 5 acts on the toothed rack 3.

For example it is assumed that a torque sensor and/or force sensor is arranged in the steering system and that the drive engine torque is known from the electric actuation. From these variables it is possible, by evaluating the force equilibrium taking into account dynamic effects, to deduce the further force variables, in particular the toothed rack force FZS. FZS is, for example, a function of the steering wheel manual torque $M_{hand}$, assistance torque of the servomotor Mservo, inertia, friction (FZS=f($M_{hand}$,$M_{servo}$, inertia, friction)).

The effective principle of a steering system that, in the quasi-static case, the steering wheel manual torque $M_{hand}$ compensates, summed with the assistance servo torque $M_{servo}$, the torques of the wheels about the virtual steering axis $M_{rad}$, applies independently of the design, for which reason the invention or the inventive method can advantageously be transferred without modifications to other designs of steering systems, in which case it should be possible to introduce just one auxiliary force, controlled in terms of amplitude, time profile and direction of action, into this steering system.

Basically, the wheel steering torques $M_{rad}$ can be divided into those which are caused by forces at the tire contact area 20 (FIG. 1) and those which arise from drive forces which act in the projection of the tire contact area onto the rotational axis of the wheel.

These forces generate a steering torque about the virtual steering axis, in each case with the corresponding lever arm. In the sense of optimum feedback to the driver, ideally only the forces at the tire contact area can be perceived in the steering wheel manual torque, that is to say that asymmetrical drive forces are predicted and their influence on the steering system is eliminated by the servomotor.

By means of the method, the distribution of the drive forces among these wheels is calculated from the available variables (usually CAN bus) of engine torque, engine speed and wheel speeds of the driven and steered wheels. Given knowledge of the structurally conditioned geometric and kinematic relationships it is possible, while taking into account the steering wheel angle, to determine the influence of the drive forces on the wheel steering torques and thus on the toothed rack.

Figure 2:
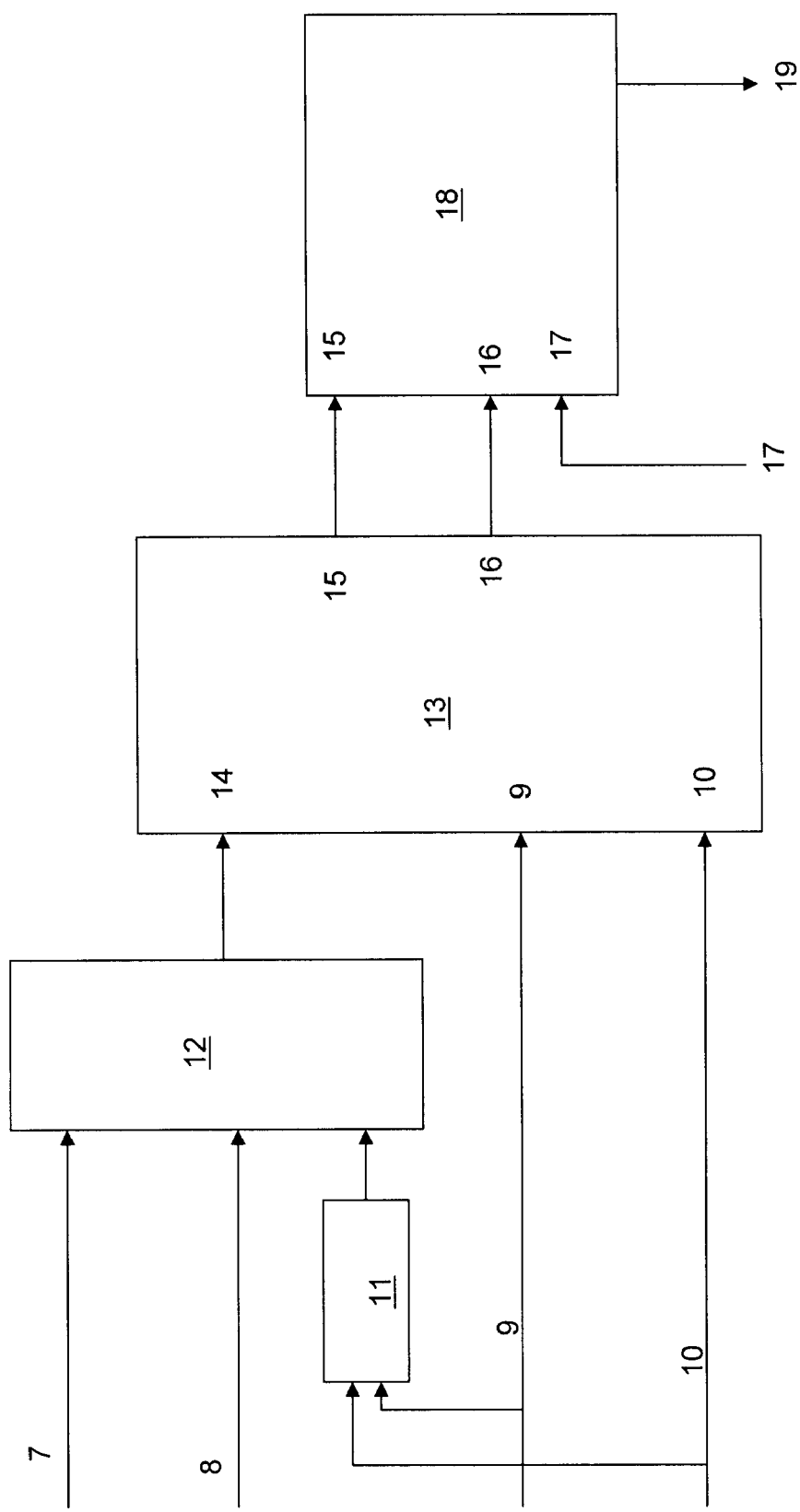
FIG. 2 is a block diagram showing the calculation of a steering force error from drive forces or drive influences.

FIG. 2 shows the preferred signal flow. In FIG. 2, the meaning of the reference numerals is as follows:
  7 Drive engine torque [Nm]
  8 Drive engine speed [Nm]
  9 Driven wheel speed, left hand [wheel/s]
  10 Driven wheel speed, right hand [wheel/s]
  11 Mean value from 9 and 10
  12 Total gear mechanism transmission ratio
  13 Model of differential gear mechanism/drive shafts
  14 Driven axle torque [Nm]
  15 Wheel drive force, left hand [N]
  16 Wheel drive force, right hand [N]
  17 Steering wheel angle [wheel]
  18 Model of axle kinematics/steering kinematics
  19 Steering force error calculated from drive forces
wherein the reference numerals 11, 12, 13 and 18 refer to model blocks and otherwise to signals.

The drive engine torque 7 and the drive engine speed 8 are supplied with the mean value 11 of the total gear mechanism transmission ratio 12 so that the driven axle torque 14 is supplied to the model 13. The model 13 corresponds to the permanently activated simulation model of the drive train. The driven wheel speeds 9 and 10 are also respectively supplied to the model 13. The model 13 generates the wheel drive force on the left hand and right hand sides, 15 and 16 respectively, which are supplied to the model 18. The steering wheel angle 17 is also supplied to the model 18. The steering force error 19 is generated in the model 18. With knowledge of these exemplary influences, the interfering steering torques on account of the drive forces are supported by the servomotor and cannot be perceived by the driver in the manual torque of the steering wheel.

In addition to the general case, it may be found that for specific operating points and configurations the calculations in the model of the differential gear mechanism/drive shaft 13 of the block diagram illustrated in FIG. 2 are not reliable. This applies in particular to small differences between the wheel speeds 9 and 10. In this case, the wheel drive forces on the left and right hand sides are assumed to be equally large.

Furthermore, geometric irregularities, such as for example ruts, may occur in the contact between the tire and the underlying surface and can have mathematically unpredictable influences on the steering torque. For these cases, a setpoint force at the toothed rack is calculated from available variables (usually CAN bus) in the developed algorithm, see in this respect also FIG. 3.

In FIG. 3, the reference numerals mean the following:
21 Vehicle speed [km/h]
22 Lateral acceleration [m/s2]
23 Yaw rate [wheel/s]
24 Steering wheel speed [wheel/s]
25 Synthetic setpoint calculation of the toothed rack force—multidimensional characteristic diagram with correction functions
26 Setpoint force for the toothed rack [N]

The vehicle speed 21, the lateral acceleration 24, the yaw rate 23 and the steering wheel speed 24 are supplied to the setpoint value calculation means 25 which calculates the setpoint force for the toothed rack 26. For this purpose, a characteristic diagram composed of vehicle data is developed and is input into the block 25. Alternately, the setpoint force at the toothed rack can also be formed from suitable mathematical equations with the same input variables instead of from this characteristic diagram. Instead of the yaw rate, the yaw acceleration can also serve as the input variable.

If the setpoint force at the toothed rack now differs from the actually occurring force in which the steering force error has been corrected, and if further preconditions, such as for example a high axle drive torque or low differential speed between the driven wheels when cornering are given in the driving situation, this setpoint force is also included in the calculation of the compensation torque. The servo assistance then applies a steering wheel manual torque corresponding to a toothed rack force between the setpoint force and the actually occurring force.

The steering wheel manual torque which can be perceived by the driver is in principle based on the toothed rack force, irrespective of whether the servo assistance by the toothed rack force is calculated from an observer model, from a torque sensor in the steering column or by some other method. Preferably it is assumed that the servo assistance by means of the toothed rack force is generated from an observer model. The interfaces are to be correspondingly adapted for other cases.

The fluid transition, whether a steering wheel manual torque corresponding to the setpoint toothed rack force 26, an actual toothed rack force 27, in which the steering force error is corrected, or an intermediate value is passed on to the driver, is carried out by the switching function 28 (illustrated in FIG. 4). This switching function is preferably tuned in such a way that the servo assistance is in principle based on the actual toothed rack force for the sake of precise feedback of the contact relationships between the tire and underlying surface, that is to say a weighting 29 of 0. Only in cases in which interfering steering influences from drive forces have to be expected and the actual toothed rack force deviates from the setpoint force is it necessary to control in the direction of the setpoint force progressively with respect to the deviation. In the extreme case of the weighting 29 of 1, a completely synthetically generated steering wheel manual torque would be applied, which does not permit any feedback of the tire/underlying surface contact but does not have any disturbance influences either. The reference numerals in FIG. 4 correspond to the previously mentioned ones, with the signals 14, 21, 22, 9, 10, 17, 27 and 26 being directed to 28 in order to carry out the weighting 29 [0 . . . 1].

Basically, as the driven axle torque increases the probability of drive influences acting on the steering system becomes greater, and therefore the weighting is displaced more toward the synthetic setpoint force. As the speed of the vehicle increases, the weighting should in turn be made to approach the actual toothed rack force, and the same applies to high lateral acceleration. If the steering wheel angle and lateral acceleration are opposed in sign, it can be assumed that countersteering, and thus a highly dynamic driving maneuver, is occurring. In this case, the actual toothed rack force is to be passed on in the sense of the feedback.

Figure 5:
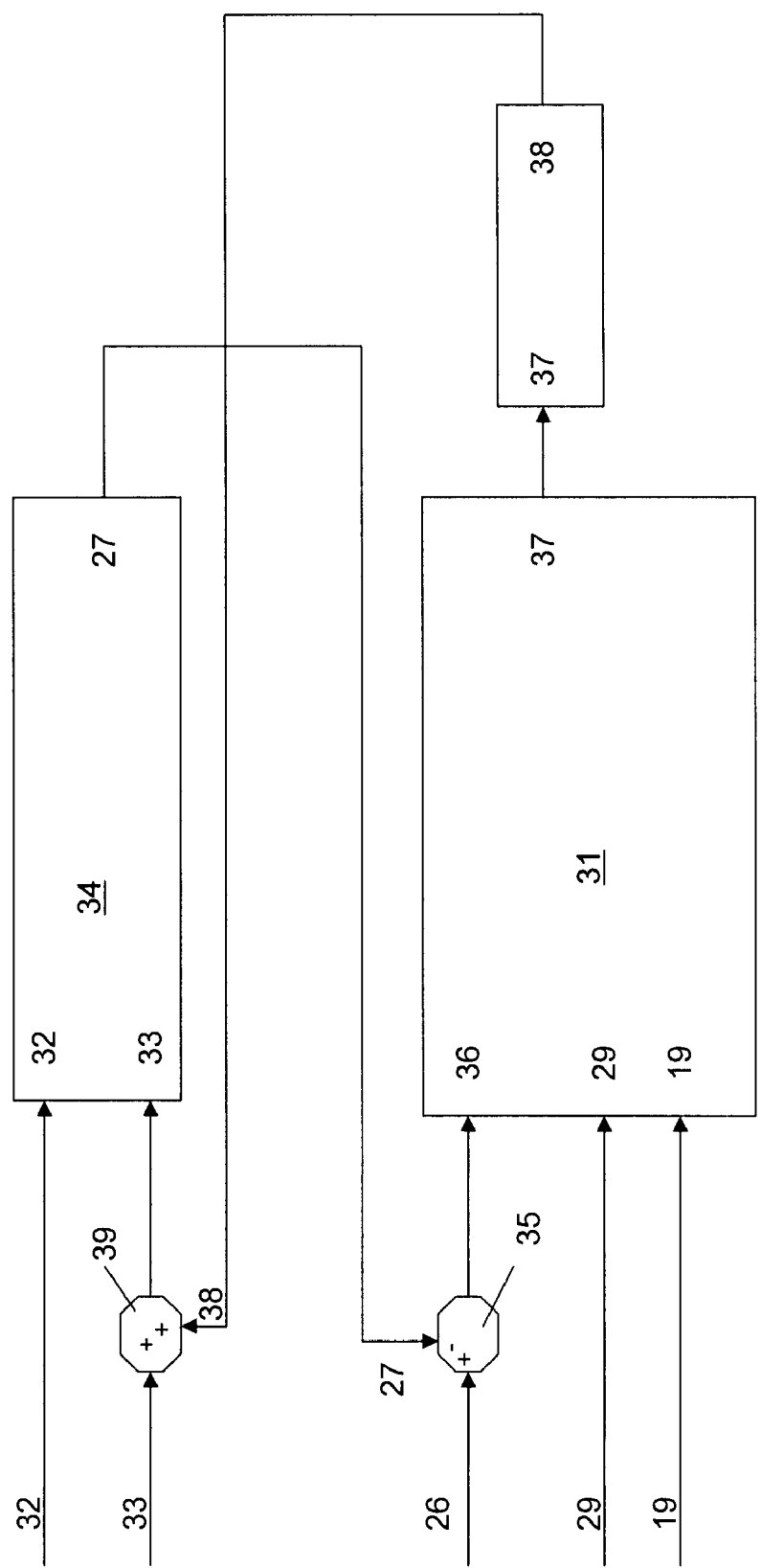
FIG. 5 is a block diagram showing the inclusion of the calculated steering force error, the setpoint force at the toothed rack and the weighting of the synthetic setpoint force in the power steering assistance.

FIG. 5 shows how the variables of steering force error, setpoint force for the toothed rack and the weighting which are described above by way of example, are included in the calculation of the compensation torque.

The steering force error 19, the weighting 29 and the setpoint force for the toothed rack 26 are applied to the block 31, correction of the toothed rack force. The steering wheel manual torque 32 and the EPAS servo torque 33 are supplied to the block 34 (steering gear mechanism) so that the actual toothed rack force 27 is generated. The latter is fed to the interface 35 with the signal of setpoint force for the toothed rack 26 so that a setpoint force deviation 36 is generated from this for the block 31.

The signal for the compensation of the toothed rack force 37 is generated in the block 31 so that the compensation torque 38 is fed to the interface 39.

Both the servo assistance and the compensation torque are referred to the toothed rack in these block diagrams with the corresponding gear mechanism transmission ratio. It is irrelevant here whether the basis for the calculation of the assisting servo force is the toothed rack force from an observer model or the steering wheel manual torque $M_{hand}$ measured in the steering column by a sensor. The interface between the total function for compensating the drive influences and the servo force is then to be correspondingly adapted.

For reasons of clarity, FIGS. 2 to 5 are illustrated separately from one another, and the block circuit diagrams can also be combined into a single one. FIGS. 2 to 4 illustrate how the input variables for the block 31 are generated.

Further characteristic variables such as, for example, the speed of the vehicle can be added to the calculation of the servo assistance.

The method according to the invention is suitable in particular on vehicles with a front driven axle and/or all wheel drive vehicles.

We claim:
1. A method for compensating for drive influences of a drive train of a motor vehicle on an electric power steering system having a manual torque and a servomotor assisted torque, said method comprising the steps of:

using an engine torque, an engine speed wheel speeds and a steering wheel angle of the motor vehicle in a simulation model of vehicle behavior;

using the modeled vehicle behavior to predict drive influences on the electric power steering system for a predetermined time profile;

calculating a compensation torque in response to the predicted influences; and applying the compensation torque to the servomotor assisted torque during the predetermined time profile such that the applied compensation torque is supported by the servomotor of the electric power steering system thereby making any disturbance that occurs as a result of the predicted drive influences imperceptible in the manual torque of the electric power steering system.

2. The method as claimed in claim 1, wherein the step of using the modeled vehicle behavior to predict drive influences on the steering system further comprises:

using wheel drive force on a left hand side, wheel drive force on a right hand side, and steering wheel angle to calculate a distribution of drive forces among the wheels; and using the distribution of drive forces generate a steering force error in response to the distribution of drive forces, whereby the steering force error is used in the step of calculating the compensation torque.

3. The method as claimed in claim 2, wherein electric power steering system further comprises a toothed rack and the method further comprises the steps of:

detecting an actual force at the toothed rack after applying the compensation torque to the servomotor;

using available vehicle parameters to calculate a setpoint force at the toothed rack;

comparing the setpoint force to the actual force to indentify a difference between the setpoint force and the actual force;

using the setpoint force in the step of calculating the compensation torque upon identification of a difference between the setpoint force and the actual force and the existence of predetermined vehicle conditions;

applying a servo-assisted steering wheel manual torque corresponding to a toothed rack force between the setpoint force and the actual force.

4. The method as claimed in claim 3, wherein the setpoint force is calculated as a function of a vehicle speed, a lateral acceleration of the vehicle and a yaw acceleration of the vehicle.

5. The method as claimed in claim 3, wherein the step of detecting an actual force for the toothed rack further comprises a measured steering torque.

6. The method as claimed in claim 2, wherein the step of applying the compensation torque further comprises modifying a lateral acceleration of the vehicle, a yaw rate and a vehicle speed to generate and apply the compensation torque to the servomotor assisted torque.

7. The method as claimed in claim 6, wherein the step of applying the compensation torque further comprises the step of applying a switching function that progressively applies a weighting factor to the compensation torque whereby a minimum weighting factor is applied in the event a precise feedback of a contact relationship between a tire and an underlying surface is desired and a maximum weighting factor is applied in the event an absence of feedback of the contact relationship is desired, a level of feedback relationship desired between the minimum and maximum being determined by a progression of deviation between the actual toothed rack force and the setpoint force.

8. The method as claimed in claim 7, wherein the step of applying a switching function further comprises applying the switching function in response to a lateral acceleration of the vehicle, a yaw rate of the vehicle, and axle drive torque, a measured steering torque and changes in steering wheel angle.

9. The method as claimed in claim 1, wherein the step of calculating a compensation torque further comprises the compensation torque being a function of an unequal slip of tires of a steerable axle.

10. The method as claimed in claim 9, wherein the step of calculating a compensation torque further comprises the compensation torque being a function of mathematical analysis of an effective lever arm of a center point, projected onto a driven axle of a tire contact area to a virtual steering axis of the wheel.

11. The method as claimed in claim 1, wherein the step of using the modeled vehicle behavior to predict drive influences in the electric power steering system further comprises the step of defining junction regions as regions in the vehicle model and predetermined time profile where disturbance torques are assumed to occur.

12. The method as claimed in claim 1, wherein the step of using the modeled vehicle behavior to predict drive influences in the electric power assisted steering system further comprises anticipating a disturbance torque that is the result of a locking effect of a differential gear mechanism which is self locking or locks in a controlled fashion.

13. The method as claimed in claim 1, wherein the step of applying the compensation torque further comprises generating the compensation torque as an additional force which is opposed to the disturbance variables.

14. The method as claimed in claim 1, wherein the step of applying the compensation torque further comprises generating the compensation torque as an additional damping force.

15. The method as claimed in claim 1, wherein the step of applying the compensation torque further comprises adapting and setting parameters of the electric power steering system.

* * * * *